April 15, 1947.                S. E. WEAVER                2,418,916
        MACHINE FOR TESTING HARDNESS OF METALS AND OTHER MATERIALS
                    Filed July 1, 1943        4 Sheets-Sheet 1

Inventor
S. E. Weaver
By Clarence A. O'Brien
and Harvey B. Jackson
Attorneys

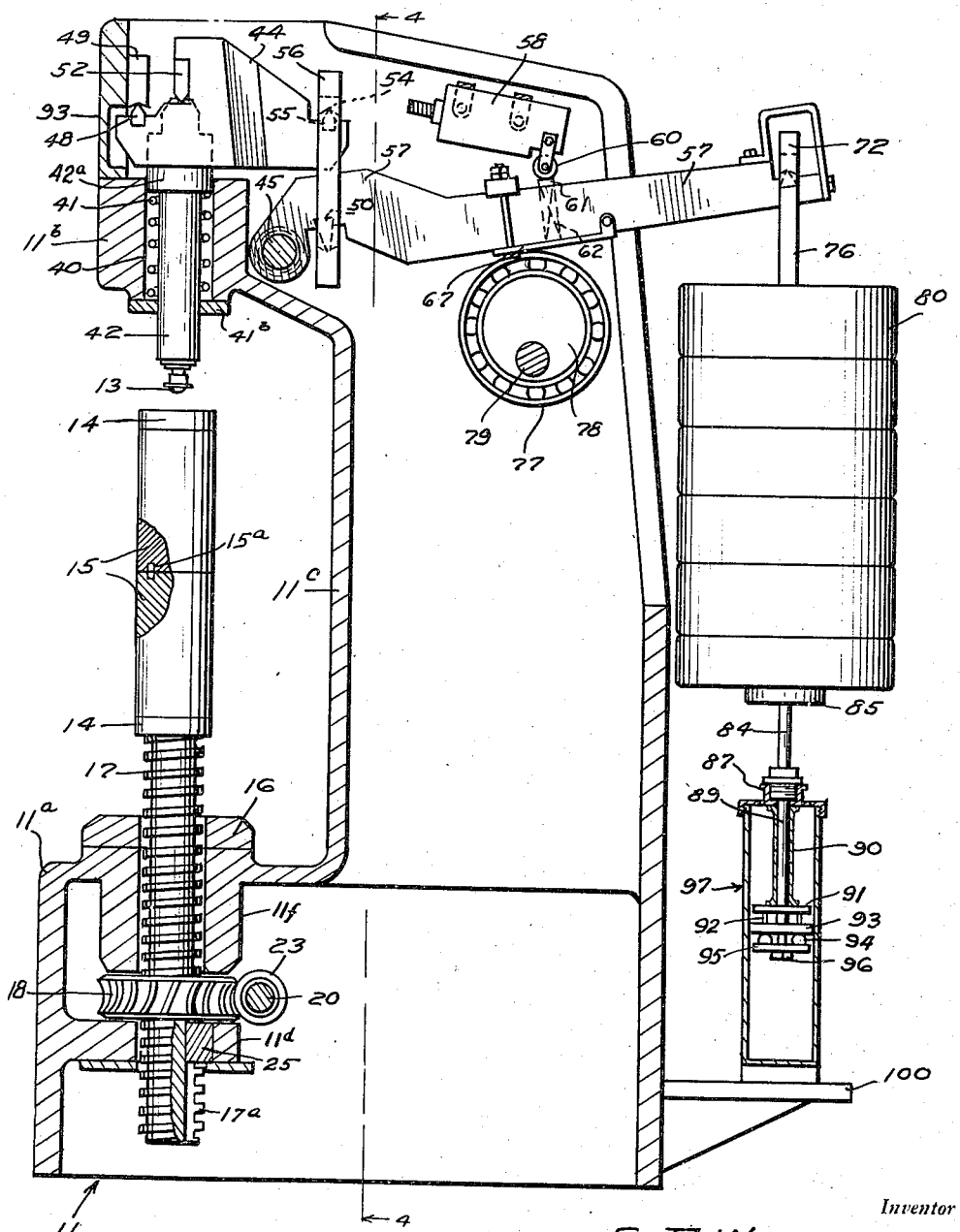

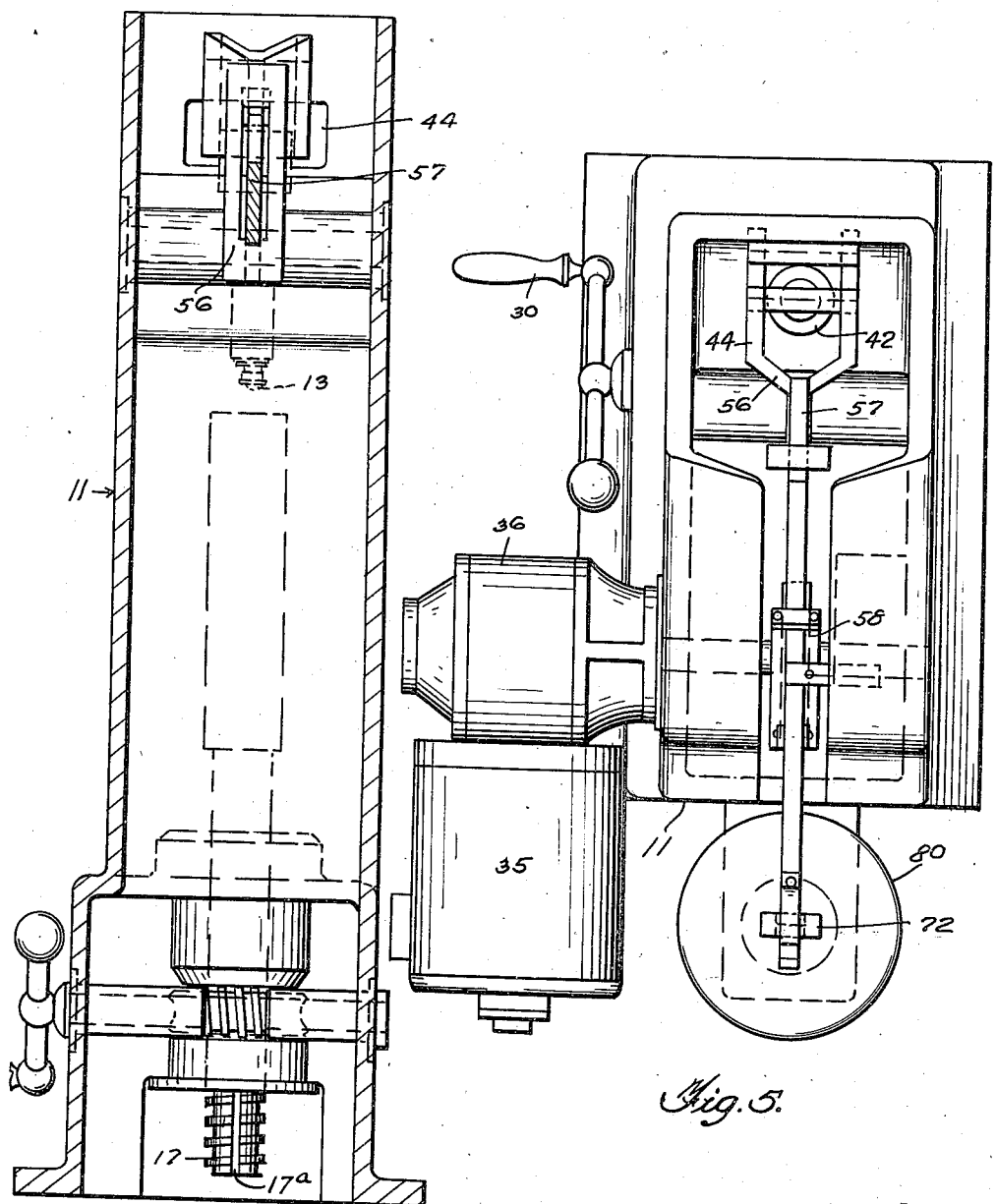

Patented Apr. 15, 1947

2,418,916

UNITED STATES PATENT OFFICE 2,418,916

MACHINE FOR TESTING HARDNESS OF METALS AND OTHER MATERIALS

Sara E. Weaver, Detroit, Mich., assignor to Steel City Testing Machines, Incorporated, Detroit, Mich., a corporation of Michigan Application July 1, 1943, Serial No. 493,100

3 Claims. (Cl. 73—81)

The present invention relates to testing machines of the Brinell type, and has for its main object a machine with very accurate calibration, easy operation, being mechanical instead of the old type machine with hand operation, and has lasting qualities and minimal upkeep cost.

The specimen table, with its anvil for supporting the specimen to be tested is, for instance, very easily elevated into testing position by a quick acting crank mechanism instead, as formerly, by a very laborious hand wheel method. Furthermore, adapters are supplied for placing on the anvil to accommodate specimens or objects of different thickness. As these adapters can be quickly positioned or removed, the use of them diminishes the time of the crank operation for positioning the specimen table and thereby still further increasing the speed of operating the machine.

Another very important improvement is the use of balanced multiple beams oscillating on finely ground and hardened knife edges. In this manner friction becomes reduced to a minimum so as to be practically negligible. Any slight friction that might occur is compensated for when the weights are calibrated. This calibration is accomplished by checking the application of the load when the test ball contacts with the specimen to be tested.

Directly after the specimen has been positioned and contacts the ball, as described, on elevating the table by means of the hand crank and quick elevating screw, or by insertion of one or more adapters between the anvil and the screw, or both, the load is released and applied by the operator, without leaving his position at the crank handle, by stepping on the pedal or foot button which is situated in a very convenient position near him so that he does not even need to release the crank handle or change his position at the crank handle. With the depression of the foot button, the electrical starter is actuated in turn energizing a motor, thereby releasing the load, setting the lever and beam system in motion to act by compression against the testing ball.

A further improvement is to be found in the provision of a dash pot to preclude any possible chance of vibration or shock by the weights so that they are cushioned during the application of the load.

In the accompanying drawings one embodiment of the invention has been illustrated, and:

Figure 3 is a vertical section along line 3—3 of Figure 2.

Figure 4 is a vertical section along line 4—4 of Figure 3, and

Figure 5 is a top plan view of the machine.

Like parts are designated by like reference characters throughout the specification, and drawings.

Figure 1:
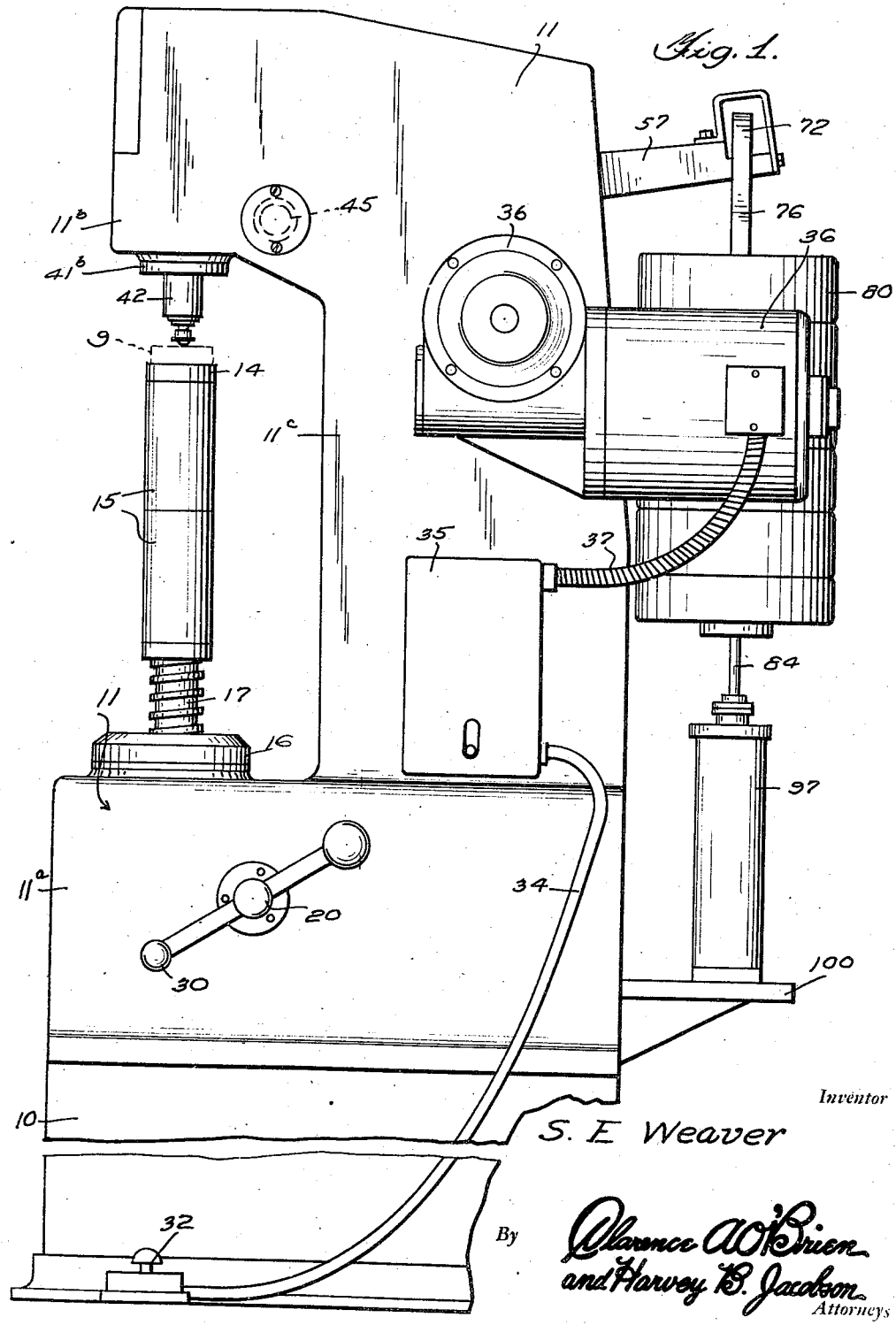
Figure 1 is a front elevation of my open-face testing machine in position ready to receive the test specimen under the test ball and the weights raised to their highest position.
Figure 2:
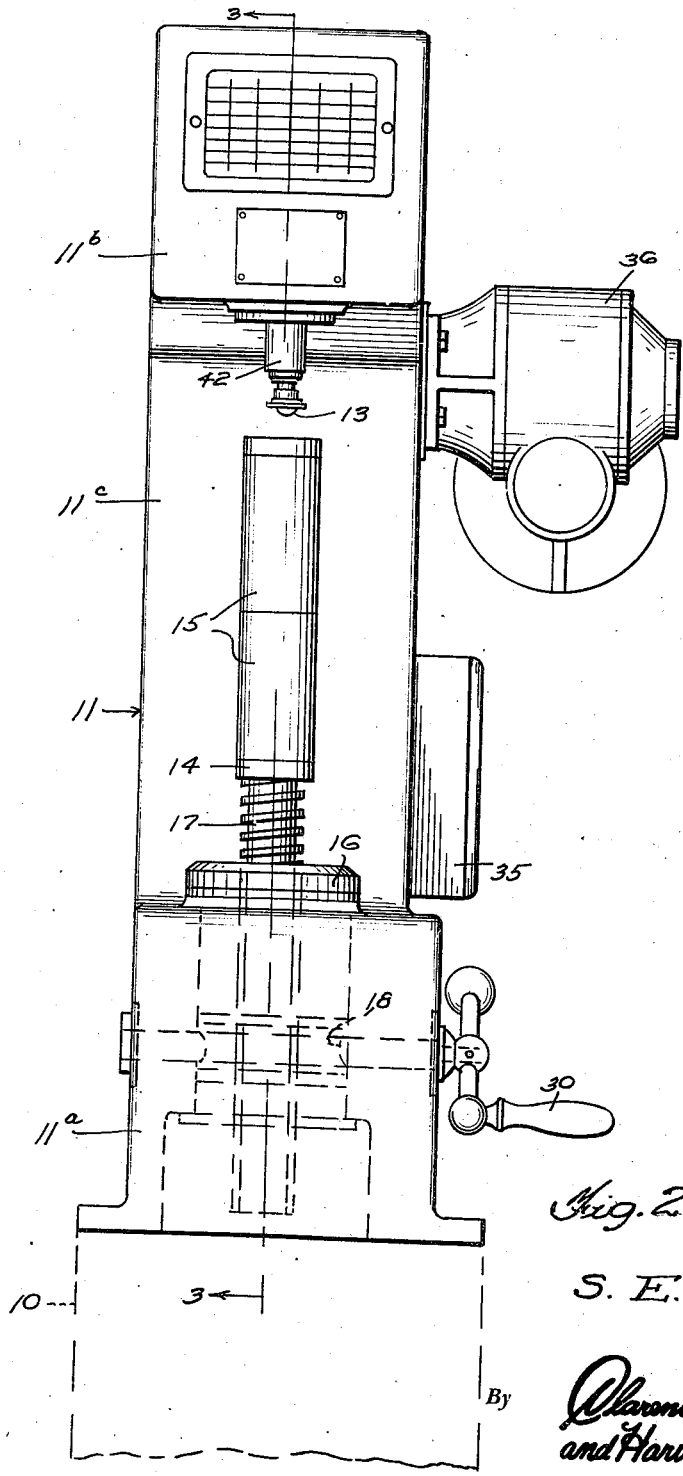
Figure 2 is a side elevation of Figure 1.

On a base 10 is mounted a frame or stand generally denoted by numeral 11, having a lower jaw 11a and an upper jaw 11b which are connected by a hollow column 11c, the front wall of which is set back from the two jaws in order to provide sufficient space horizontally for the test specimen between the jaws and around the vertical axis of the plunger and the testing ball 13. In a machine of moderate size this set back or throat distance is at least 6 inches back of said axis, or more if needed, and the jaw openings vertically measure about 12.5 inches.

In the lower jaw is mounted the elevating mechanism for the anvil or specimen table 14, forming the head of preferably triple threaded elevating screw 17, here shown single threaded and upon which is placed specimen 9 to be tested. This mechanism further consists of a worm 23 operated by a crank handle 30 on a worm shaft 20 and a worm gear 18 threaded on the elevating screw 17, the latter being keyed in the jaw 11a in the usual manner by a key 25 fixed in the lip 11d of the lower jaw 11a and engaging in the groove 17a of the screw 17 so as to assure elevation of the screw without turning. This gear wheel 18 resting on the lip 11d, is held down by the boss 11f which forms a unit of jaw 11a or is fixedly secured therein. This elevating mechanism, being of any suitable construction, needs no further description. On the anvil 14 are indicated a pair of interengaging adapters 15 with studs 15a used for speedy adjustment of the needed opening. On top of the boss surrounding the screw 17 is placed loosely one or more ring washers 16 to limit the downward movement of the screw.

In the upper jaw 11b and the upper portion of the frame column 11c are located the mechanical parts for delivering the blow to the test ball 13. These are the spindle 42, at the bottom end of which is found a housing for removably retaining the hardened test ball 13 so that its bottom portion projects enough for penetrating the surface of the test specimen 9. The spindle 42 terminates at its top with an enlarged head 42a fitting in a vertical bore 40 of the upper jaw 11b, so that the spindle, ball, anvil and elevating screw all are in perfect axial alignment. In the bore 40 is located a compression spring 41 supported on the retaining washer 41b, held in place by screws or any other means.

In the upper part of the stand 11 are also located the main beam 57 and the sub beam 44, of which the main beam is mounted to oscillate on the shaft 45, while it is supported at its under side near the middle on a cam 78, with a ball race 77, and its free end extending rearwardly through the rear wall of the column 11c in order to carry the load 80, the compound weight of which may amount to about 300 kilograms, or more, as required. This load is hung on a rod 76 which runs through the central holes of the disks forming the load so as to rest on the stop 85 at the bottom end of the rod, while the upper end of the rod terminates with a yoke 72 hung freely at the extreme end of the main beam 57.

The sub beam 44 is provided with three knife edges to eliminate friction during operation, one of which, 48, is fixed at the front end of the sub beam 44 and is held, pointing upwardly, in contact with the seat 49 in the top jaw. The second knife edge 52 is carried near the middle of the sub beam 44, pointing downwardly, and engaging the seat formed at the top of the head of the spindle plunger 42. The third knife edge 55 is secured on the top of the rear end of the sub beam 44, and pointing upwardly, in order to engage in the upper seat 54 of the link 56. This link is of rectangular shape with an elongated central opening in order to straddle the rear end of the beam 44 as well as the front end of the main beam 57 and to engage with its lower seat at the bottom of the slot with the downwardly pointing knife edge 50 secured in the main beam 57 adjacent the beam shaft 45.

The cam 78, which is circular so that the ball race 77 will be free to rotate thereon, is eccentrically mounted to turn with the shaft 79 mounted in suitable bearings in the column 11c of the frame or stand 11. The function of the cam is to modify the angular amount of movement of the main beam 57. In this manner, when the cam 78 has been turned with its longest radius upward, that is, standing in its upper dead center position and making contact between its race ring 77 and the saddle plate 67 located on the under side of the main beam 57, the latter is held at its upper limit of angular movement, and as a consequence the spindle 42 and the test ball 13 will have a movement accordingly as communicated through the main beam 57 from the drop of the load 80 hung from the free end thereof. Reversely, with its shortest radius upwards, the cam 78 will permit a wider angular swing of the main beam 57. The amount of pressure exerted on the ball and plunger can be modified by the amount of weight hung on the rod 76 at the end of the main beam 57. For this purpose the maximum load 80, say about 300 kilograms, may be made up of several cheese-like blocks, of which are here shown six, ranging from 25 to 50 kilograms weight each, which are piled up on the rod 76.

Above the main beam 57 is shown an upper limit switch 58 secured at the top of the stand 11. This has a roller 60 facing the top edge of the main beam 57 in which is seated a yieldingly supported stud 61 by a spring 62 reaching through the beam to the saddle plate 67. When the main beam 57 is in its uppermost position, with the cam at upper dead center, the stud 61 contacts the roller 60, thereby actuating the electrically operated switch 58.

At 36 is shown a housing containing an electric motor and speed reducer for releasing the load 80. By means of a cable 37, current from the starter box 35 is carried to energize the motor. This current is derived from a main source when the pedal 32 at the base 10 is pressed down to close the current, through the cable 34 to the starter box 35.

Any suitable known and conventional electrical circuit may be employed to control the motor. These form no part of my invention and have not been illustrated. By way of example, one satisfactory circuit would consist of connecting electric power source in series to the motor 36 through the limiter switch 58, the starter switch 32 being placed in shunt around the limiter switch.

Below the load rod 76 is shown an axial extension 84 forming a piston rod 89 with a head 93 at its bottom and working in the dash pot 97, which is carried on a bracket 100 of the stand 11. The axial distance between the piston head 93 and a nut 87 threaded for adjustment above the dash pot 97 is determined by a sleeve 90 around the piston rod 89, the bottom end of which abuts against a washer 91 on the underside of which are carried pins 92. At the extreme bottom end of the rod 89 is threaded another adjustment nut 96 on which rests a spider 95 on which are deposited metal balls 94 beneath the piston head 93, with holes for pins 92 which rest on the balls 94, thus providing a valve cooperating therewith to obtain a cushioning effect against the descending load 80. By means of the dash pot and the cam 78 the speed of action of the load and the beams is accordingly effectively controlled on applying the pressure against the spindle 42 and the ball 13. Or in other words the beam 57 drops under the control of the dash pot.

Although I have described and shown herein a preferred embodiment of my invention, I do not intend to limit the application of the invention thereto, except as may be required by the scope of the subjoined claims.

I claim:

1. In an open-faced testing machine for metal and other hard material, a stand having an upper and a lower jaw member between which the test specimen is placed so as to be clearly visible from three sides, a quick acting elevating screw in the lower jaw, a suitable crank and worm mechanism therefor, a specimen carrying table on the upper end of said screw, a plunger spindle provided with a head forming a bearing seat and yieldingly mounted in said upper jaw in alignment with the axis of said screw and adapted to carry a testing ball of hardened steel, a system of cooperating beams comprising a main and a secondary beam and a connection between adjacent ends of said beams for transmitting load pressure from the free end of the main beam through the secondary beam onto said plunger spindle, a shaft in the upper jaw upon which shaft the inner end of said main beam is mounted to oscillate, said secondary beam having a central knife edge engaging the seat in the plunger head, a fixed bearing seat in said upper jaw, upper and lower bearing seats in said connection, a front knife edge and a rear knife edge on said secondary beam engaging respectively said fixed bearing seat and said upper saddle seat, means for suspending a load at the free end of the main beam comprising a rod with a plurality of weights assembled thereon, an anti-friction knife edge bearing supporting said main beam in said connection, electrically operated means for limiting the amount of angular oscillation of said main beam, means including a dash pot for controlling speed of movement of said load, and an adapter placed between said specimen table and elevating screw thereby lessening the amount of adjustment for positioning the table to accommodate the specimen and thus speeding the operation.

2. In an open-faced testing machine for metal and other hard material, a stand having upper and lower jaws receiving for visibility from three sides a test specimen, a quick acting elevating screw in the lower jaw, a crank and worm mechanism therefor, a specimen carrying table supported on said screw, a plunger spindle yieldingly mounted in said upper jaw in alignment with said screw, a testing ball carried by said plunger spindle, a system of beams for transmitting pressure to said plunger spindle, comprising, a main beam oscillatably mounted upon a shaft in the upper jaw, and a secondary beam, a load, including a plurality of weights, suspended from a free end of said main beam, anti-friction bearing means for supporting said beam system in said stand, comprising, a link engaging the bottom edge of said main beam adjacent said shaft and the upper edge of the secondary beam on its adjacent end, a direct bearing element contacting the opposite end of the secondary beam and the stand, and further bearing means between the plunger and an intermediate point on said secondary beam, means for limiting the amount of angular oscillation of said main beam, means controlling the speed of movement of said load, said limiting means comprising an electric switch, actuating means upon said main beam for opening said switch in the uppermost position of said main beam, means including an electrical means for blocking downward movement of said main beam, a power source, said electric switch being placed in series with said power source and said electrical means for controlling said electrical means.

3. In an open-faced testing machine for metal and other hard material, a stand having upper and lower jaws, receiving for visibility from three sides a test specimen, a quick acting elevating screw in the lower jaw, a crank and worm mechanism therefor, a specimen carrying table supported on said screw, a plunger spindle yieldingly mounted in said upper jaw in alignment with said screw, a testing ball carried by said plunger spindle, a system of beams for transmitting pressure to said plunger spindle, comprising, a main beam oscillatably mounted upon a shaft in the upper jaw, and a secondary beam, a load including a plurality of weights, suspended from a free end of the main beam, anti-friction bearing means for supporting said beam system in said stand, comprising a link engaging the bottom edge of said main beam adjacent to said shaft and the upper edge of the secondary beam on its adjacent end, a direct bearing element contacting the opposite end of the secondary beam and the stand, and further bearing means between the plunger spindle and said secondary beam, means for limiting the speed of movement of the load, electrically operated means for limiting the amount of angular oscillation of said main beam, comprising a cam contacting the under surface of said main beam, an electric motor drivingly connected to said cam, an electric circuit from a power source to said motor, a limiting switch controlling said motor, in said circuit and mounted adjacent said main beam, operating means for said limiting switch carried by said main beam for actuating the former upon predetermined upward movement of the latter, and a starting switch connected in said circuit in shunt with said limiting switch.

SARA E. WEAVER.

REFERENCES CITED

The following references are of record in the file of this patent:

UNITED STATES PATENTS

| Number | Name | Date |
| --- | --- | --- |
| 1,490,762 | Boyd | Apr. 15, 1924 |
| 1,646,195 | German | Oct. 18, 1927 |
| 1,722,263 | Barry et al. | July 30, 1929 |
| 2,053,472 | Gogan | Sept. 8, 1936 |
| 1,762,497 | Wilson | June 10, 1930 |
| 2,321,717 | Wallace | June 15, 1943 |
| 1,885,972 | Wilson | Nov. 1, 1932 |

FOREIGN PATENTS

| Number | Country | Date |
| --- | --- | --- |
| 353,729 | British | July 30, 1931 |
| 806,089 | French | Sept. 14, 1936 |